United States Patent
Toyoda

(10) Patent No.: US 11,351,625 B2
(45) Date of Patent: *Jun. 7, 2022

(54) METHOD FOR JOINING DISSIMILAR METAL PLATES

(71) Applicant: TOYOTA JIDOSHA KABUSHIKI KAISHA, Toyota (JP)

(72) Inventor: Akihiro Toyoda, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 179 days.

This patent is subject to a terminal disclaimer.

(21) Appl. No.: 16/271,156

(22) Filed: Feb. 8, 2019

(65) Prior Publication Data

US 2019/0247949 A1 Aug. 15, 2019

(30) Foreign Application Priority Data

Feb. 9, 2018 (JP) .............................. JP2018-021780

(51) Int. Cl.
*B23K 11/20* (2006.01)
*B23K 11/11* (2006.01)
(Continued)

(52) U.S. Cl.
CPC .............. *B23K 11/20* (2013.01); *B23K 11/11* (2013.01); *B23K 2103/04* (2018.08); *B23K 2103/10* (2018.08)

(58) Field of Classification Search
CPC ....... B23K 11/11; B23K 11/115; B23K 11/20; B23K 11/16; B23K 11/163; B23K 11/185;
(Continued)

(56) References Cited

U.S. PATENT DOCUMENTS 3,666,913 A 5/1972 Haefling et al.
3,860,778 A * 1/1975 Rudd ..................... B23K 13/00
219/67

(Continued)

FOREIGN PATENT DOCUMENTS

CN 101043968 A 9/2007
CN 103753005 A 4/2014
(Continued)

OTHER PUBLICATIONS

"Welding Technology and Engineering Professional Experimental Course/Chen Yuhua, Sun Guodong English Wang", Beijing: Aviation Industry Press, Sep. 2016, pp. 301-302 (11 pages total).

(Continued)

*Primary Examiner* — John J Norton
*Assistant Examiner* — Simpson A Chen
(74) *Attorney, Agent, or Firm* — Sughrue Mion, PLLC

(57) ABSTRACT

A method for joining two dissimilar metal plates having different volume resistivity with enhanced joint strength. The method includes overlaying a first metal plate made of first metal and a second metal plate made of second metal with higher volume resistivity and higher melting point in comparison with the first metal, bringing a pair of electrodes into contact with the surface of a portion of the second metal plate overlapping the first metal plate, supplying current between the electrodes so as to resistance-heat the second metal present in a current-flowing region to a temperature lower than the melting point of the second metal and higher than the melting point of the first metal, thereby partially melting the first metal plate with the heat so that an intermetallic compound is generated between the first and second metal plates, and thus joining the first and second metal plates via the intermetallic compound.

7 Claims, 6 Drawing Sheets

(51) Int. Cl.
*B23K 103/10* (2006.01)
*B23K 103/04* (2006.01)

(58) Field of Classification Search
CPC ............ B23K 11/3009; B23K 2103/10; B23K 2103/04
USPC .......................................................... 219/118
See application file for complete search history.

(56) References Cited

U.S. PATENT DOCUMENTS

| | | | |
|---|---|---|---|
| 6,459,064 B1 * | 10/2002 | Trubert | B23K 11/00 219/85.1 |
| 10,518,482 B2 * | 12/2019 | Iwamoto | B29C 66/81811 |
| 2007/0212565 A1 | 9/2007 | Urushihara et al. | |
| 2009/0050608 A1 | 2/2009 | Hayashi et al. | |
| 2011/0097594 A1 | 4/2011 | Tanaka et al. | |
| 2013/0056451 A1 * | 3/2013 | Hasegawa | B23K 11/11 219/127 |
| 2015/0053655 A1 * | 2/2015 | Sigler | B23K 11/115 219/91.22 |
| 2017/0106466 A1 * | 4/2017 | Sigler | B23K 11/185 |
| 2017/0297136 A1 | 10/2017 | Brown et al. | |
| 2019/0224775 A1 * | 7/2019 | Toyoda | B23K 11/11 |
| 2019/0283162 A1 | 9/2019 | Shi et al. | |

FOREIGN PATENT DOCUMENTS

| | | |
|---|---|---|
| CN | 105269137 A | 1/2016 |
| CN | 107297564 A | 10/2017 |
| CN | 107398627 A | 11/2017 |
| JP | 2861819 B2 | 2/1999 |
| JP | 2003-019569 A | 1/2003 |
| JP | 2005-144500 A | 6/2005 |
| JP | 2008-73728 A | 4/2008 |
| JP | 4519508 B2 | 8/2010 |
| JP | 4905766 B2 | 3/2012 |
| JP | 4941876 B2 | 5/2012 |
| JP | 2012-152786 A | 8/2012 |
| JP | 2012-179630 A | 9/2012 |
| JP | 2013-031858 A | 2/2013 |
| JP | 2013031858 A * | 2/2013 |
| JP | 5315207 B2 | 10/2013 |
| JP | 5468350 B2 | 4/2014 |
| JP | 5624901 B2 | 11/2014 |
| JP | 2015-093283 A | 5/2015 |
| JP | 6068147 B2 | 1/2017 |
| JP | 2017-070174 A | 4/2017 |

OTHER PUBLICATIONS

Communication dated Dec. 21, 2020 by the United States Patent and Trademark Office in U.S. Appl. No. 16/255,217.
U.S. Appl. No. 16/255,217, filed Jan. 23, 2019.
Communication dated Apr. 21, 2021 from the U.S. Patent and Trademark Office in U.S. Appl. No. 16/255,217.
Ueda et al. "On the Alloy Layers formed by the Reaction between Ferrous Alloys and Molten Aluminium", Journal of Japan Metallurgy, vol. 42, 1978, pp. 543-549.
Bergmann et al., "Einfluss intermetallischer Phasen auf die Langzeitstabilitat von ultraschallgeschweiBten Kupfer-Aluminium-Kontakten", Metall-Forschung, 67th edition, Nov. 2013, pp. 504-507 (5 pages total).
Dobrinski et al., "PhysikfurIngenieure", B. G.Teubner Stuttgart, 5th edition, 1980, p. 218, ISBN 3-519-46508-6 (6 pages total).
Non-Final Office Action dated Sep. 8, 2021 from the U.S. Patent and Trademark Office in U.S. Appl. No. 16/255,217.
Notice of Allowance dated Feb. 11, 2022 from the U.S. Patent and Trademark Office in U.S. Appl. No. 16/255,217.

* cited by examiner

METHOD FOR JOINING DISSIMILAR METAL PLATES

CROSS REFERENCE TO RELATED APPLICATIONS

The present application claims priority from Japanese patent application JP 2018-021780 filed on Feb. 9, 2018, the content of which is hereby incorporated by reference into this application.

BACKGROUND

Technical Field

The present disclosure relates to a method for joining two dissimilar metal plates that are different in volume resistivity.

Background Art

Conventionally, spot welding has been performed to join an aluminum alloy plate and a steel plate. As the spot welding of this type, for example, JP 2012-152786 A proposes a method for joining dissimilar metal plates that includes overlaying an aluminum alloy plate and a steel plate one on top of the other, sandwiching the overlapping portion thereof between a pair of electrodes and pressurizing them, and supplying current between the electrodes while maintaining the pressurized state so as perform resistance spot welding. According to such a joining method, when current is supplied between the electrodes, portions of the aluminum alloy plate and the steel plate through which the current flows generate heat due to their electric resistance and thus melt, so that the two plates are joined.

SUMMARY

However, when dissimilar metal plates like an aluminum alloy plate and a steel plate are joined using the joining method disclosed in JP 2012-152786 A, one of the metal plates with lower volume resistivity than that of the other metal plate is more difficult to generate heat with the current supplied thereto, in comparison with the other metal plate. Therefore, the one metal plate should be supplied with a larger amount of current than that required to melt the other metal plate.

Accordingly, in order to join such dissimilar metal plates, it would be impossible to melt the one metal plate unless it is supplied with a larger amount of current than that required to melt the other metal plate with higher volume resistivity. Thus, it follows that the other metal plate is supplied with an excessive amount of current. Consequently, it is concerned that voids and the like may be generated in a portion of the other metal plate that has been supplied with the excessive amount of current and thus has melted due to the current, and thus that a sufficient joint strength of the dissimilar metal plates may not be obtained.

The present disclosure has been made in view of the foregoing, and exemplary embodiments relate to providing a method for joining dissimilar metal plates, capable of enhancing the joint strength of two dissimilar metal plates that are different in volume resistivity.

In view of the foregoing, a method for joining dissimilar metal plates in accordance with the present disclosure is a method for joining two dissimilar metal plates, including overlaying, as the dissimilar metal plates, a first metal plate and a second metal plate one on top of the other, the first metal plate being made of a first metal, the second metal plate being made of a second metal with higher volume resistivity than that of the first metal and a higher melting point than that of the first metal; bringing a pair of electrodes into contact with a surface of a portion of the second metal plate overlapping the first metal plate; and supplying current between the pair of electrodes so as to resistance-heat the second metal present in a current-flowing region through which the current flows to a temperature lower than the melting point of the second metal and higher than the melting point of the first metal, thereby partially melting the first metal plate with heat from the resistance-heated second metal so that an intermetallic compound of the first metal and the second metal is generated between the first metal plate and the second metal plate, and thus joining the first and second metal plates via the intermetallic compound.

It should be noted that a "first metal plate made of a first metal" as referred to in the present disclosure includes the first metal plate containing only the first metal, and a plate-shaped base material containing only the first metal and having a metal plating film formed thereon, and indicates a plate containing the first metal as the base material, in practice. Likewise, a "second metal plate made of a second metal" as referred to in the present disclosure includes the second metal plate containing only the second metal, and a plate-shaped base material containing only the second metal and having a metal plating film formed thereon, and indicates a plate containing the second metal as the base material, in practice. Further, each of the "first metal and second metal" as referred to in the present disclosure may be a metal containing only the metal element, or an alloy containing an(other) metal(s) added thereto.

According to the present disclosure, a pair of electrodes are brought into contact with the surface of a portion of the second metal plate overlapping the first metal plate, and current is supplied between the electrodes. In this case, the second metal present in the current-flowing region is resistance-heated to a temperature lower than the melting point of the second metal and higher than the melting point of the first metal. Accordingly, the second metal plate does not melt, and a portion including the current-flowing region is heated in the sold-phase state so that heat of the second metal in the heated portion is transferred to the first metal plate adjacent thereto. Consequently, the first metal plate is melted by the heat of the resistance-heated second metal. In this case, the second metal of the second metal plate that is in contact with the melted portion of the first metal plate diffuses to the first metal side so that an intermetallic compound of the first metal and the second metal is generated between the first metal plate and the second metal plate. Consequently, the intermetallic compound becomes a joining material capable of joining the first metal plate and the second metal plate.

Further, impurities contained in the surface of the second metal plate can be diffused to the meted portion of the first metal plate without the second metal plate melted. Therefore, a fresh surface containing the second metal is formed on the surface of the second metal plate, and the fresh surface contacts the melted portion of the first metal plate so that an intermetallic compound can be formed on the fresh surface. Consequently, the joint strength between the first metal plate and the second metal plate can be enhanced.

According to the present disclosure, unlike the conventional joining method, there is no need to supply excessive current for melting the second metal to the second metal plate with higher volume resistivity than that of the first metal plate, and only the first metal can be melted while the second metal is in the solid-phase state so that the first and second metal plates can be joined. Therefore, voids resulting from excessive heating are unlikely to be formed in the second metal plate or in the joined portion thereof. Further, if the joined portion that has been heated due to excessive heating is cooled naturally, the structure of the joined portion is likely to become coarse. However, the present disclosure that can suppress such excessive heating can avoid coarsening of the structure of the joined portion and thus can secure the strength of the joined portion.

Further, if the first and second metal plates are securely joined with the current supplied between the electrodes, the first and second metal plates need not be pressurized against each other. In some embodiments, the bringing the pair of electrodes into contact with the surface of the portion of the second metal plate overlapping the first metal plate may include arranging a pressurizing member between the pair of electrodes, the pressurizing member being made of a non-conductive material, and the joining the first and second metal plates may include supplying current between the pair of electrodes while pressurizing the second metal plate against the first metal plate using the pressurizing member arranged between the pair of electrodes.

According to such a configuration, current is supplied between the pair of electrodes while the second metal plate is pressurized against the first metal plate by the pressurizing member arranged between the pair of electrodes. Therefore, the redundant intermetallic compound generated between the first metal plate and the second metal plate can be pushed out to surrounding. Accordingly, since the redundant intermetallic compound in the joined portion can be reduced and the thickness of the intermetallic compound can be kept thin, the strength of the joined portion can be enhanced.

Further, the types of the first and second metals are not particularly limited as long as the second metal has higher volume resistivity than that of the first metal and a higher melting point than that of the first metal. In some embodiments, the first metal plate is one of an aluminum plate or an aluminum alloy plate, and the second metal plate is a steel plate.

Herein, the melting point of aluminum or aluminum alloy that forms the first metal plate is about 600° C., and the melting point of steel that forms the second metal plate is about 1500° C. Therefore, according to such a configuration, it is possible to resistance-heat the second metal that forms the second metal plate without melting the second metal plate by supplying current between the pair of electrodes, and melt aluminum or aluminum alloy that is the first metal with the heat of the resistance-heated second metal. In this case, iron and the like of the steel plate that is the second metal plate (which is a solid phase) diffuses to the melted portion (which is a liquid-phase portion) of aluminum or aluminum alloy of the first metal plate. Consequently, an intermetallic compound containing at least aluminum and iron is generated between the first metal plate and the second metal plate. The intermetallic compound serves as a material for joining the first metal plate and the second metal plate.

In addition, a steel plate having a plating film formed thereon, such as a galvanized steel plate, is difficult to be joined with a sufficient joint strength to an aluminum plate or an aluminum alloy plate. However, in such a configuration, since metal of the plating film formed on the surface of the steel plate diffuses to the melted aluminum or aluminum alloy, and a fresh surface of the steel plate is thus generated, joint strength can be enhanced.

According to the present disclosure, the joint strength of two dissimilar metal plates made of different metallic materials can be enhanced.

DETAILED DESCRIPTION

Hereinafter, a method for joining dissimilar metal plates in accordance with an embodiment of the present disclosure will be described.

1. Regarding Resistance-Welding Apparatus 1

Figure 1:
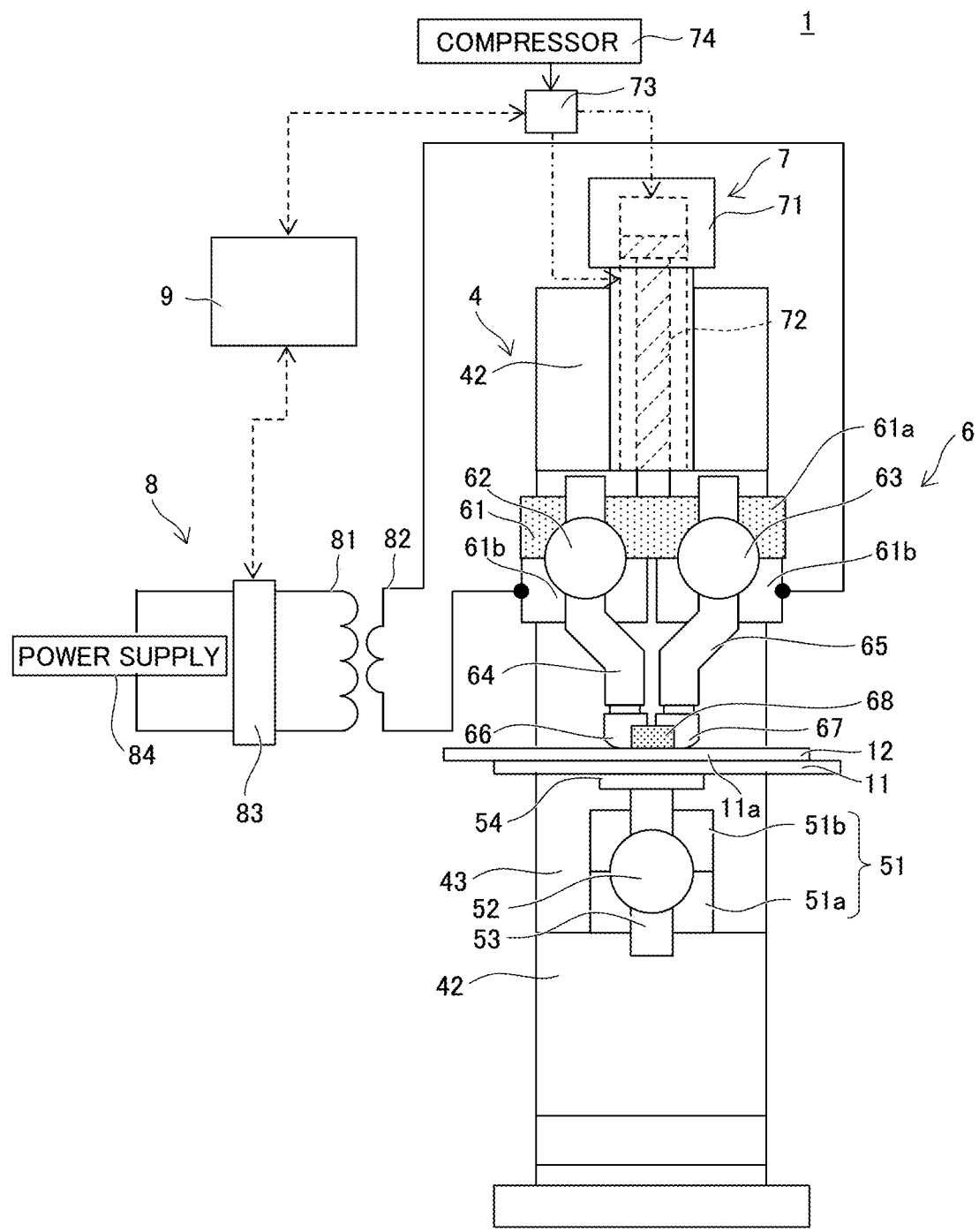
FIG. 1 is a front view of a resistance-welding apparatus in accordance with an embodiment of the present disclosure.
Figure 2:
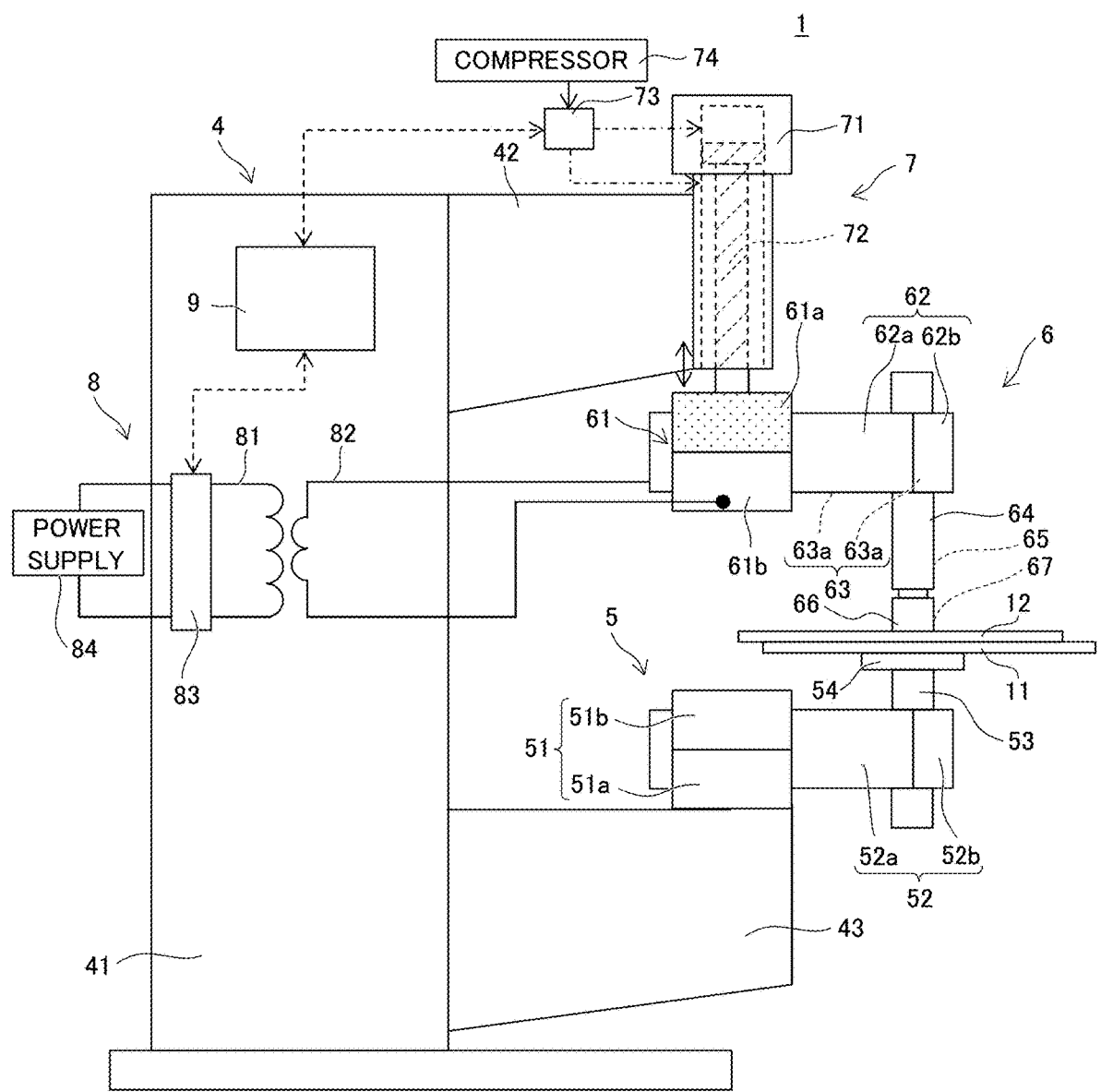
FIG. 2 is a left side view of the resistance-welding apparatus shown in FIG. 1.

First, an exemplary resistance-welding apparatus 1 adapted to perform a method for joining dissimilar metal plates in accordance with an embodiment of the present disclosure will be described with reference to FIGS. 1 and 2. FIG. 1 is a front view of the resistance-welding apparatus 1 in accordance with an embodiment of the present disclosure. FIG. 2 is a left side view of the resistance-welding apparatus 1 shown in FIG. 1.

As shown in FIGS. 1 and 2, the resistance-welding apparatus 1 is an apparatus for joining dissimilar metal plates made of metals that are different in volume resistivity and melting point, through resistance welding. Specifically, the resistance-welding apparatus 1 is adapted to weld a first metal plate 11, which is made of a first metal described below, and a second metal plate 12, which is made of a second metal with higher volume resistivity than that of the first metal and a higher melting point than that of the first metal, to each other.

The resistance-welding apparatus 1 includes a body 4, a support 5 adapted to support the first and second metal plates 11 and 12, a welding unit 6 adapted to weld the first and second metal plates 11 and 12 to each other, an elevator 7 adapted to move the welding unit 6 up and down, a current supplying unit 8 adapted to supply current to the welding unit 6, and a controller 9 adapted to control the elevator 7 and the current supplying unit 8.

The body 4 includes, as shown in FIG. 2, a housing 41, an upper arm 42 extending in the horizontal direction from the upper portion of the housing 41, and a lower arm 43 extending in the horizontal direction from the lower portion of the housing 41 so as to be opposite the upper arm 42. The welding unit 6 is attached to the upper arm 42 via the elevator 7, and the support 5 is attached to the lower arm 43.

The support 5 includes a support block 51, first and second support arms 52 and 53, and a mount base 54. The support block 51 includes a pair of upper and lower blocks 51a and 51b, and the lower block 51a is fixed to the lower arm 43. The upper block 51b is attached to the lower block 51a so as to sandwich the first support arm 52 therebetween.

The first support arm 52 extends in the horizontal direction from the support block 51, and includes an arm body 52a attached to the support block 51, and a fixing member 52b attached to the arm body 52a at the distal end thereof so as to grip the second support arm 53. The second support arm 53 extends upward from the support block 51, and the mount base 54 is attached to the distal end of the second support arm 53. The first metal plate 11 and the second metal plate 12 that are the members to be welded together are mounted on the mount base 54.

The welding unit 6 is attached to the upper arm 42 via the elevator 7. The elevator 7 includes a cylinder 71, a piston 72 adapted to slide in the cylinder 71, and a pneumatic circuit (i.e., an air circuit) 73 adapted to supply predetermined actuating air into the cylinder 71. The pneumatic circuit 73 is connected to a compressor 74 adapted to supply compressed air, and is controlled to supply actuating air with a predetermined pressure to one of the upward-side port or the downward-side port of the piston 72 in the cylinder 71 on the basis of a control signal from the controller 9. The elevator 7 may be an electrical pressurizing device with a mechanism configured to directly operate with the rotation of a motor. Even when an electrical pressurizing device is used, the first and second metal plates 11 and 12 can be joined as described below.

In this way, the piston 72 can move up and down, and consequently, a pair of electrodes 66 and 67 and a pressurizing member 68 of the welding unit 6 described below can be moved toward the mount base 54 (that is, the first metal plate 11).

The welding unit 6 includes a holding block 61 attached to the distal end of the cylinder 71, a pair of third support arms 62 and 63 extending in the horizontal direction from the holding block 61, and a pair of fourth support arms 64 and 65 extending downward from the third support arms 62 and 63, respectively. Further, the welding unit 6 has the pair of electrodes 66 and 67 and the pressurizing member 68 arranged therebetween at the distal ends of the fourth support arms 64 and 65.

The holding block 61 includes a fixing block 61a and a pair of gripping blocks 61b and 61b. The fixing block 61a is made of a non-conductive material, such as resin or ceramics. Each gripping block 61b is connected to the positive electrode side or the negative electrode side of the current supplying unit 8. Each gripping block 61b is made of a conductive material, and may be made of a metallic material, such as alloy steel. For example, each gripping block 61b may be made of a material with lower volume resistivity than that of the second metal that forms the second metal plate 12 to be welded. Accordingly, generation of heat from the gripping block 61b during welding can be suppressed.

The fixing block 61a has a pair of recess portions for housing a part of the third support arms 62 and 63, respectively, and the gripping blocks 61b are attached to the fixing block 61a so as to grip the respective third support arms 62 and 63. Further, the gripping blocks 61b are apart from each other and thus are not in contact with each other. Accordingly, the third support arms 62 and 63 are not electrically connected directly.

Each third support arm 62 (63) is made of a conductive material, such as a metallic material exemplarily illustrated as the material of the gripping blocks 61b, and includes an arm body 62a (63a) and a fixing member 62b (63b) attached thereto at its distal end so as to sandwich the fourth support arm 64 (65) therebetween.

The fourth support arm 64 (65) is made of a conductive material, such as a metallic material exemplarily illustrated as the material of the gripping blocks 61b, extends downward from the third support arm 62 (63), and has the electrode 66 (67) attached to the distal end thereof. In this embodiment, each of the electrodes 66 and 67 has formed therein a coolant passage (not shown) to flow coolant water. Coolant water flowing through the coolant passage can cool each of the electrodes 66 and 67 during welding.

The pair of electrodes 66 and 67 are made of copper alloy, such as chromium copper (Cu—Cr), chromium zirconium copper (Cu—Cr—Zr), beryllium copper (Cu—Be), or tungsten copper (Cu—W), and are arranged opposite each other in positions apart from each other. In such arrangement, a space for housing the pressurizing member 68 is formed between the pair of electrodes 66 and 67, and the pressurizing member 68 is housed in the space. In this embodiment, the pressurizing member 68 is sandwiched between the pair of electrodes 66 and 67. The pressurizing member 68 is made of a non-conductive material, such as ceramics or thermosetting resin. Accordingly, current between the pair of electrodes 66 and 67 does not flow through the pressurizing member 68.

According to such a configuration, in this embodiment, the pressurizing member 68 moves up and down together with the pair of electrodes 66 and 67 as the elevator 7 moves up and down. In this embodiment, the pair of electrodes 66 and 67 and the pressurizing member 68 are moved integrally by a single elevator 7 and thus, the second metal plate 12 is pressurized at the same time by the pair of electrodes 66 and 67 and by the pressurizing member 68. However, for example, the pressurizing member 68 may be provided with another elevator different from the aforementioned elevator 7. Accordingly, the pressurizing member 68 can be moved up and down at a different timing from the pair of electrodes 66 and 67, and the pressurizing member 68 can be pressurized against the second metal plate 12 with a pressure that does not depend on the contact pressure that is the pressure of the pair of electrode 66 and 67 contacting the second metal plate 12 (for example, with a pressure higher than that of the pair of electrodes 66 and 67).

The current supplying unit 8 is adapted to supply current between the pair of electrodes 66 and 67, and includes an electric circuit 83 connected to a power supply 84, a primary coil 81 connected to the electric circuit 83, and a secondary coil 82 adapted to increase the amount of current flowing through the primary coil 81. The secondary coil 82 is electrically connected to the pair of gripping blocks 61b and 61b. When welding is performed, a control signal from the controller 9 is input to the electric circuit 83, and current from the power supply 84 flows through the primary coil 81. Thus, the primary coil 81 is magnetically excited and the thus generated magnetic flux flows through the inside of the core, and so current flows through the secondary coil 82. Accordingly, current can be supplied between the pair of electrodes 66 and 67 while the pair of electrodes 66 and 67 are in contact with the second metal plate 12.

2. Method for Joining Dissimilar Metal Plates

Figure 3A:
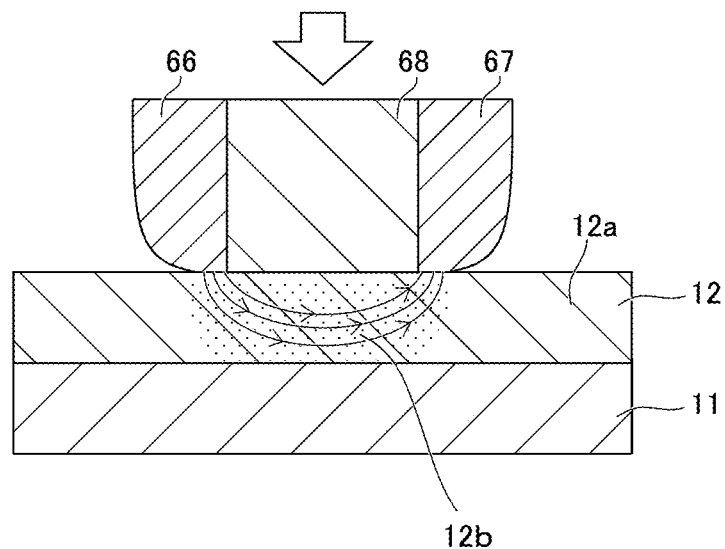
FIG. 3A is a schematic cross-sectional view for illustrating the heated stated of a second metal plate in a joining method that uses the resistance-welding apparatus shown in FIG. 1.
Figure 3B:
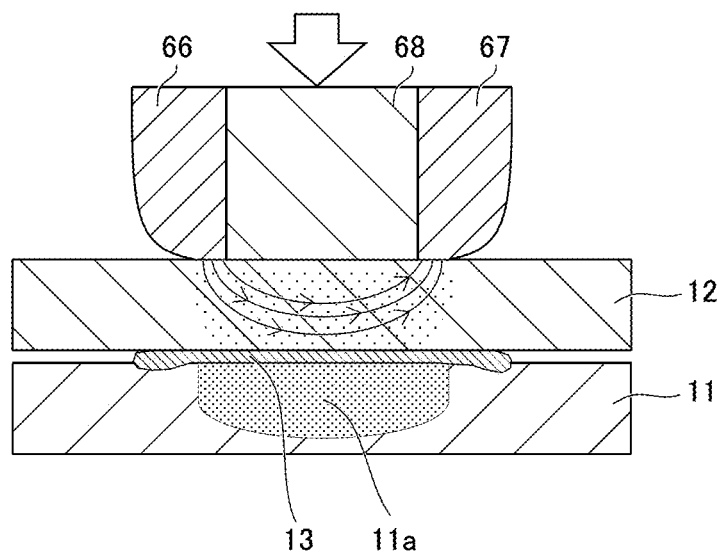
FIG. 3B is a schematic cross-sectional view for illustrating a state in which the first metal plate has been melted in the state shown in FIG. 3A, and an intermetallic compound generated between the first metal plate and the second metal plate has been pushed out to surrounding through pressurization.

Hereinafter, a method for joining two dissimilar metal plates using the resistance-welding apparatus 1 will be described with reference to FIGS. 3A and 3B in addition to FIGS. 1 and 2. FIG. 3A is a schematic cross-sectional view for illustrating the heated stated of the second metal plate in a joining method that uses the resistance-welding apparatus shown in FIG. 1. FIG. 3B is a schematic cross-sectional view for illustrating a state in which the first metal plate has been melted in the state shown in FIG. 3A, and an intermetallic compound generated between the first metal plate and the second metal plate has been pushed out to surrounding through pressurization.

2-1. Step of Preparing Dissimilar Metal Plates

First, in this embodiment, the first metal plate 11 and the second metal plate 12 made of metals that are different in volume resistivity and melting point are prepared as the two dissimilar metal plates to be welded together. The first metal plate 11 is made of a first metal, and the second metal plate 12 is made of a second metal different from the first metal. The volume resistivity of the second metal is higher than that of the first metal, and the melting point of the second metal is higher than that of the first metal. It should be noted that a metal film such as a plating film may be formed on one of the opposed surfaces of the first metal plate 11 and the second metal plate 12. The thickness of the first metal plate 11 may be 0.5 to 5.0 mm, and the thickness of the second metal plate 12 may be 0.5 to 5.0 mm.

For example, in this embodiment, the first metal plate 11 is an aluminum plate or an aluminum alloy plate, and the first metal is aluminum or aluminum alloy. The second metal plate 12 is a steel plate, and the second metal is steel. For example, the volume resistivity of aluminum or aluminum alloy at 20° C. is 2 to $6 \times 10^{-8}$ Ω·m, and the volume resistivity of steel at 20° C. is 10 to $20 \times 10^{-8}$ Ω·m. Thus, the volume resistivity of steel is higher than that of aluminum or aluminum alloy even in the temperature range in which aluminum or aluminum alloy melts. In addition, the melting point of aluminum or aluminum alloy is about 600° C., and the melting point of steel is about 1500° C. Thus, the melting point of steel is higher than that of aluminum or aluminum alloy.

In order to suitably perform joining as described below, the volume resistivity of the second metal that forms the second metal plate may be greater than that of the first metal that forms the first metal plate by $5 \times 10^{-8}$ Ω·m or more at the melting point of the first metal of the first metal plate 11. Further, the melting point of the second metal may be greater than that of the first metal by 400° C. or more. Accordingly, a phenomenon that current supplied to the second metal plate 12 flows through the first metal plate 11 can be suppressed, and thus, the first metal plate 11 can be favorably melted with heat of the resistance-heated second metal. Examples of the combination of the first metal plate and the second metal plate include a case where the first metal plate is an aluminum plate or an aluminum alloy plate and the second metal plate is a steel plate, and a case where the first metal plate is a magnesium plate and the second metal plate is a steel plate.

2-2. Contact Step

Next, as shown in FIGS. 1, 3A, and the like, the first metal plate 11 and the second metal plate 12 are overlaid one on top of the other, and the pair of electrodes 66 and 67 are made to contact the surface of an overlapping portion 12a that is a portion of the second metal plate 12 overlapping the first metal plate 11.

Specifically, as shown in FIG. 1, the first metal plate 11 and the second metal plate 12 are mounted in this order on the mount base 54. Accordingly, the second metal plate 12 is arranged in a position opposite the pair of electrodes 66 and 67. In such a state, the pneumatic circuit 73 is controlled on the basis of a control signal from the controller 9 so that actuating air is supplied to the cylinder 71 and the piston 72 is lowered. Along with this, the welding unit 6 is lowered and the overlapping portion 12a of the second metal plate 12 is pressurized with a predetermined pressure by the pair of electrodes 66 and 67. Further, at the same time, the overlapping portion 12a of the second metal plate 12 is pressurized with the predetermined pressure by the pressurizing member 68 arranged between the pair of electrodes 66 and 67.

In this embodiment, although the overlapping portion 12a of the second metal plate 12 is pressurized by the pair of electrodes 66 and 67 and the pressurizing member 68, the overlapping portion 12a of the second metal plate 12 may be pressurized with the predetermined pressure only by the pressurizing member 68 and pressurized with a pressure lower than the predetermined pressure by the pair of electrodes 66 and 67, for example. Such a contact state can be implemented by, for example, arranging an elastic member, such as a spring member, between the upper face of the pressurizing member 68 and the lower face of each of the electrodes 66 and 67 in contact with the upper face of the pressurizing member 68. That is, when the electrodes 66 and 67 are lowered to a position where the electrodes contact the overlapping portion 12a of the second metal plate 12, the pressurizing member 68 is urged against the overlapping portion 12a of the second metal plate 12 due to compressive deformation of the elastic member. With the urging force, the pressurizing member 68 can be pressurized against the overlapping portion 12a of the second metal plate 12.

2-3. Joining Step

In the joining step, current is supplied between the pair of electrodes 66 and 67 so that the second metal present in a current-flowing region 12b is resistance-heated to a temperature lower than the melting point of the second metal and higher than the melting point of the first metal. Herein, although the current-flowing region 12b is resistance-heated, the temperature thereof is lower than the melting point of the second metal. Thus, the second metal does not melt. However, since the current-flowing region 12b is heated to a temperature higher than the melting point of the first metal, the first metal plate 11 is partially melted by the heat of the resistance-heated second metal. Accordingly, an intermetallic compound 13 of the first metal and the second metal is generated between the first metal plate 11 and the second metal plate 12, and thus, the first and second metal plates 11 and 12 are joined via the intermetallic compound 13.

More specifically, the electric circuit 83 is controlled on the basis of a control signal from the controller 9 so as to flow current through the primary coil 81 so that current is generated by the secondary coil 82 and the current is supplied between the pair of electrodes 66 and 67. In this embodiment, the current is supplied between the pair of electrodes 66 and 67 while the second metal plate 12 is pressurized against the first metal plate 11 by the pressurizing member 68 arranged between the pair of electrodes 66 and 67.

In this case, the controller 9 controls the electric circuit 83 so as to control the amount of current supplied between the pair of electrodes 66 and 67 and the current supply time such that they become a preset amount of current and a preset current supply time, respectively. The conditions of the present amount of current and the present current supply time are the conditions that allow the second metal of the current-flowing region 12b to be resistance-heated to a temperature lower than the melting point of the second metal and higher than the melting point of the first metal. Such conditions can be determined through experiments conducted in advance and the like.

Accordingly, the second metal plate 12 does not melt, and a portion including the current-flowing region is heated in the solid-phase state (see FIG. 3A). Then, the heat of the second metal in the heated portion is transferred to the first metal plate 11 adjacent thereto. Consequently, a part of the first metal plate 11 (specifically, a portion of the first metal plate 11 in contact with the second metal plate 12 near the current-flowing region 12b thereof) is melted by the heat of the resistance-heated second metal. It should be noted that the second metal plate 12 is made of a second metal with higher volume resistivity than that of the first metal of the first metal plate 11 and a higher melting point than that of the first metal. Therefore, current is unlikely to flow through the first metal plate 11 during welding, and thus, the first metal plate 11 does not melt due to resistance heating by the current.

Further, at this time, the second metal of the second metal plate 12 in contact with a melted portion 11a of the first metal plate 11 diffuses to the side of the first metal plate 11 (specifically, the melted portion 11a thereof), and the intermetallic compound 13 of the first metal and the second metal is generated between the first metal plate 11 and the second metal plate 12. Consequently, the intermetallic compound 13 becomes a joining material capable of joining the first metal plate 11 and the second metal plate 12.

Further, impurities contained in the surface of the second metal plate 12 can be diffused to the melted portion 11a of the first metal plate 11 without the second metal plate 12 melted. Therefore, a fresh surface made of the second metal is formed on the surface of the second metal plate 12, and the fresh surface contacts the melted portion of the first metal plate 11 so that the intermetallic compound 13 can be generated on the fresh surface. Consequently, the joint strength between the first metal plate 11 and the second metal plate 12 can be enhanced.

In this way, only the first metal can be melted while the second metal is in the solid-phase state, and the first and second metal plates 11 and 12 can be joined. Therefore, voids resulting from excessive heating are unlikely to be generated in the second metal plate 12 or in the joined portion thereof, and thus, coarsening of the structure of the joined portion can be avoided and the strength of the joined portion can be secured.

During welding, each of the electrodes 66 and 67 is cooled by coolant water flowing therein, and the surface layer of the second metal plate 12 is cooled by the electrodes 66 and 67. Therefore, the surface of the second metal plate 12 in contact with the electrodes 66 and 67 is less likely to be heated than is the other current-flowing region 12b through which current flows during welding. Accordingly, local heating of the surface of the second metal plate 12 that contacts the electrodes 66 and 67 can be reduced.

Herein, for example, the intermetallic compound 13 is brittler than the first metal and the second metal. Therefore, if the intermetallic compound 13 has grown to several μm or more, the strength of the joined portion of the first metal plate 11 and the second metal plate 12 may decrease. However, in this embodiment, as described above, current is supplied between the pair of electrodes 66 and 67 while the second metal plate 12 is pressurized against the first metal plate 11 by the pressurizing member 68 as shown in FIG. 3B, and thus, the redundant intermetallic compound 13 generated between the first metal plate 11 and the second metal plate 12 can be pushed out to surrounding (to the outside of the pressurized region) by the pressurizing member 68. Accordingly, since the redundant intermetallic compound 13 in the joined portion can be reduced and the thickness of the intermetallic compound 13 can be kept thin, the strength of the joined portion can be enhanced.

EXAMPLES

Hereinafter, Examples of the present disclosure will be described.

[Example 1-1]

The first metal plate and the second metal plate were joined using the resistance-welding apparatus shown in FIG. 1. First, 6000 series aluminum alloy with a plate thickness of 1.0 mm was prepared as the first metal plate, and a high-tension galvanized steel plate with a plate thickness of 0.7 mm was prepared as the second metal plate. Next, the first metal plate and the second metal plate were overlaid one on top of the other, and a pair of electrodes were brought into contact with the second metal plate with a pressure applied by the pair of electrodes and the pressurizing member set to 3.5 kN, a current supply time set to 0.42 msec, and welding current set to 8.4 kA as shown in Table 1, so that a test piece having the first metal plate and the second metal plate that are joined was produced.

[Examples 1-2 to 1-8]

Figure 4:
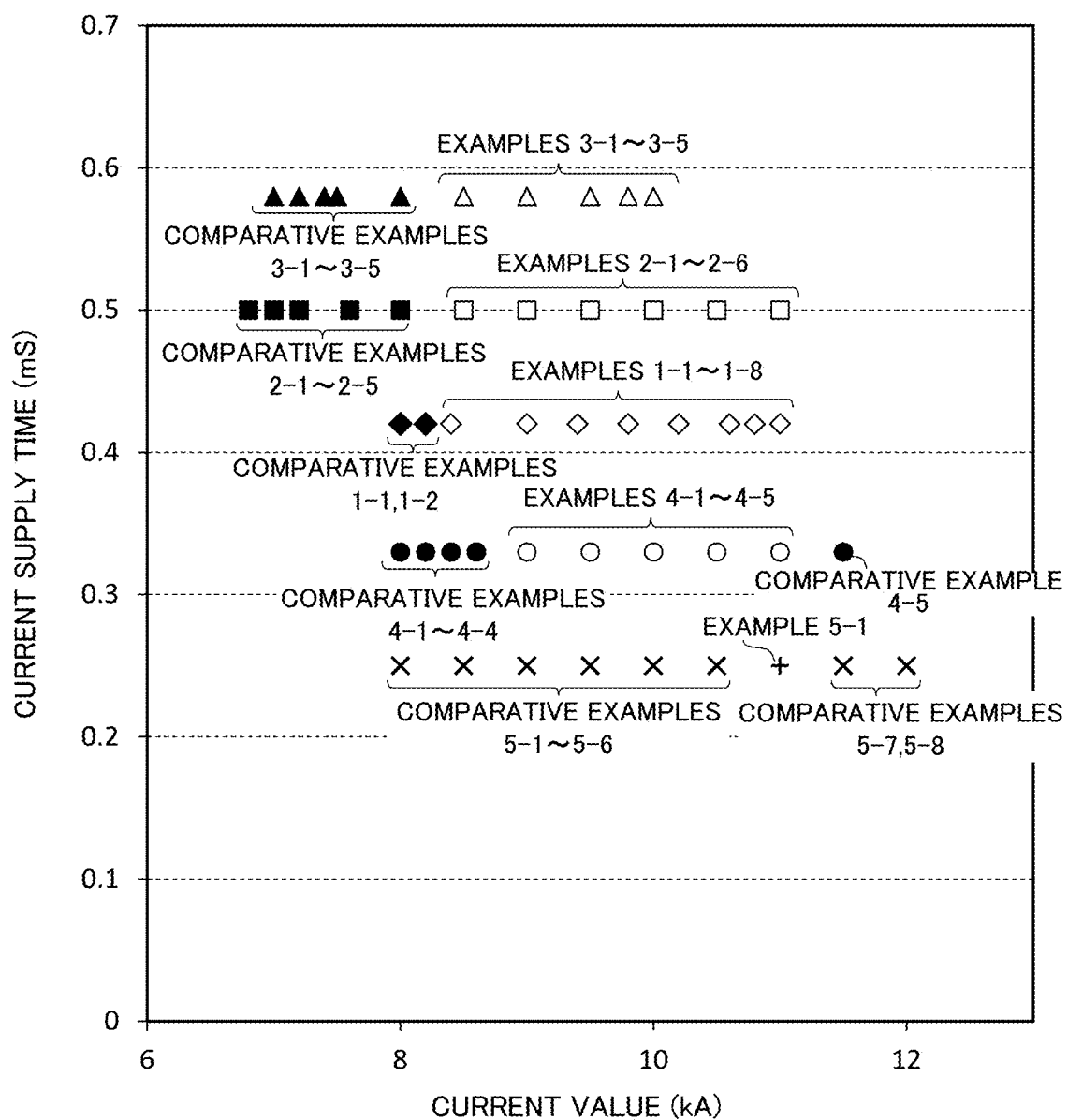
FIG. 4 is a graph showing the relationship between the current supply time and the current value of each Example and each Comparative Example.

As in Example 1-1, test pieces of Examples 1-2 to 1-8 were produced. These examples are different from Example 1-1 in the conditions of the value of current supplied during welding as shown in Table 1 and FIG. 4. In Example 1-8, the second metal plate generated excessive heat during welding, and thus, the first metal plate was heated excessively, and the thus melted first metal scattered from the portion between the first metal plate and the second metal plate. In Examples 1-1 to 1-7, the first metal melted during welding did not scatter. Table 1 show these results. In Table 1, the presence or absence of the melting of the second metal plate during welding indicates the result obtained by confirming whether or not the second metal plate was welded to the electrodes and by observing the structure as described below.

Comparative Examples 1-1 and 1-2

As in Example 1-1, test pieces of Comparative Examples 1-1 and 1-2 were produced. These examples are different from Example 1-1 in the conditions of the value of current supplied during welding as shown in Table 1 and FIG. 4. In Comparative Examples 1-1 and 1-2, the value of current supplied during welding was smaller than those of Examples 1-1 to 1-8. In Comparative Examples 1-1 and 1-2, the first metal melted during welding did not scatter. Table 1 shows the results.

[Examples 2-1 to 2-6]

As in Example 1-1, test pieces of Examples 2-1 to 2-6 were produced. These examples are different from Example 1-1 in the conditions of the value of current supplied and the current supply time during welding as shown in Table 1 and FIG. 4. The current supply time of each of Examples 2-1 to 2-6 was 0.50 msec. In Example 2-6, the first metal of the first metal plate was heated excessively during welding, and the thus melted first metal scattered from the portion between the first metal plate and the second metal plate as in Example 1-8. Meanwhile, in Examples 2-1 to 2-5, the first metal melted during welding did not scatter. Table 1 shows the results.

[Comparative Examples 2-1 to 2-5]

As in Example 2-1, test pieces of Comparative Examples 2-1 to 2-5 were produced. These examples are different from Example 2-1 in the conditions of the value of current supplied during welding as shown in Table 1 and FIG. 4. In each of Comparative Examples 2-1 to 2-5, the value of current supplied during welding was smaller than those of Examples 2-1 to 2-6. In Comparative Examples 2-1 to 2-5, the first metal melted during welding did not scatter. Table 1 shows the results.

[Examples 3-1 to 3-5]

As in Example 1-1, test pieces of Examples 3-1 to 3-5 were produced. These examples are different from Example 1-1 in the conditions of the value of current supplied and the current supply time during welding as shown in Table 1 and FIG. 4. The current supply time of each of Examples 3-1 to 3-5 was 0.58 msec. In Examples 3-4 and 3-5, the first metal of the first metal plate was heated excessively during welding and the thus melted first metal scattered from the portion between the first metal plate and the second metal plate as in Example 1-8. In Examples 3-1 to 3-3, the first metal melted during welding did not scatter. Table 1 shows the results.

[Comparative Examples 3-1 to 3-5]

As in Example 3-1, test pieces of Comparative Examples 3-1 to 3-5 were produced. These examples are different from Example 3-1 in the conditions of the value of current supplied during welding as shown in Table 1 and FIG. 4. In each of Comparative Examples 3-1 to 3-5, the value of current supplied during welding was smaller than those of Examples 3-1 to 3-3. In Comparative Examples 3-1 to 3-5, the first metal melted during welding did not scatter. Table 1 shows the results.

[Examples 4-1 to 4-5]

As in Example 1-1, test pieces of Examples 4-1 to 4-5 were produced. These examples are different from Example 1-1 in the conditions of the value of current supplied and the current supply time during welding as shown in Table 1 and FIG. 4. In each of Examples 4-1 to 4-5, the current supply time was 0.33 msec. In Examples 4-1 to 4-5, the first metal melted during welding did not scatter. Table 1 shows the results.

[Comparative Examples 4-1 to 4-5]

As in Example 4-1, test pieces of Comparative Examples 4-1 to 4-5 were produced. These examples are different from Example 4-1 in the conditions of the value of current supplied during welding as shown in Table 1 and FIG. 4. In each of Comparative Examples 4-1 to 4-4, the value of current supplied during welding was smaller than those of Examples 4-1 to 4-5, and in Comparative Example 4-5, the value of current supplied during welding was larger than those of Examples 4-1 to 4-5. In Comparative Example 4-5, the first metal was heated excessively, and the thus melted first metal scattered, and in addition, the second metal plate melted during welding, and the thus melted second metal plate was welded to the electrodes. In Comparative Examples 4-1 to 4-4, the first metal melted during welding did not scatter. Table 1 shows the results.

[Example 5-1]

As in Example 1-1, a test piece of Example 5-1 was produced. This example is different from Example 1-1 in the conditions of the value of current supplied and the current supply time during welding as shown in Table 1 and FIG. 4. The current supply time of Example 5-1 was 0.25 msec.

[Comparative Examples 5-1 to 5-8]

As in Example 5-1, test pieces of Comparative Examples 5-1 to 5-8 were produced. These examples are different from Example 5-1 in the conditions of the value of current supplied during welding as shown in Table 1 and FIG. 4. In Comparative Examples 5-1 to 5-6, the value of current supplied during welding was smaller than that of Example 5-1, and in each of Comparative Examples 5-7 and 5-8, the value of current supplied welding was larger than that of Example 5-1. In Comparative Examples 5-7 and 5-8, the first metal was heated excessively, and the thus melted first metal scattered, and further, the second metal plate melted during welding, and the thus melted second metal plate was welded to the electrode.

(Test for Shear Strength)

For each of the aforementioned test pieces, the first metal plate of each test piece was held on one side and the second metal plate was held on the other side. Then, load was applied in the direction of separating these metal plates. The strength of each test piece when the test piece was shear-fractured was the shear strength of the test piece. Table 1 shows the results.

TABLE 1

|  | Pressure (kN) | Current Value (kA) | Current Supply Time (msec) | Shear Strength (kN) | Intermetallic Compound | Scattering of Melted First Metal | Melting of Second Metal Plate |
| --- | --- | --- | --- | --- | --- | --- | --- |
| Comparative Example 1-1 | 3.50 | 8.0 | 0.42 | 0.00 | Absent | Absent | Absent |
| Comparative Example 1-2 | 3.50 | 8.2 | 0.42 | 0.23 | Absent | Absent | Absent |
| Example 1-1 | 3.50 | 8.4 | 0.42 | 2.41 | Present | Absent | Absent |
| Example 1-2 | 3.50 | 9.0 | 0.42 | 2.52 | Present | Absent | Absent |
| Example 1-3 | 3.50 | 9.4 | 0.42 | 2.71 | Present | Absent | Absent |
| Example 1-4 | 3.50 | 9.8 | 0.42 | 3.84 | Present | Absent | Absent |
| Example 1-5 | 3.50 | 10.2 | 0.42 | 4.56 | Present | Absent | Absent |
| Example 1-6 | 3.50 | 10.6 | 0.42 | 4.83 | Present | Absent | Absent |
| Example 1-7 | 3.50 | 10.8 | 0.42 | 3.74 | Present | Absent | Absent |
| Example 1-8 | 3.50 | 11.0 | 0.42 | 3.37 | Present | Present | Absent |
| Comparative Example 2-1 | 3.50 | 6.8 | 0.50 | 0.00 | Absent | Absent | Absent |
| Comparative Example 2-2 | 3.50 | 7.0 | 0.50 | 0.00 | Absent | Absent | Absent |
| Comparative Example 2-3 | 3.50 | 7.2 | 0.50 | 0.23 | Absent | Absent | Absent |
| Comparative Example 2-4 | 3.50 | 7.6 | 0.50 | 0.77 | Absent | Absent | Absent |
| Comparative Example 2-5 | 3.50 | 8.0 | 0.50 | 0.79 | Absent | Absent | Absent |
| Example 2-1 | 3.50 | 8.5 | 0.50 | 1.80 | Present | Absent | Absent |
| Example 2-2 | 3.50 | 9.0 | 0.50 | 1.90 | Present | Absent | Absent |
| Example 2-3 | 3.50 | 9.5 | 0.50 | 2.10 | Present | Absent | Absent |

TABLE 1-continued

|  | Pressure (kN) | Current Value (kA) | Current Supply Time (msec) | Shear Strength (kN) | Intermetallic Compound | Scattering of Melted First Metal | Melting of Second Metal Plate |
| --- | --- | --- | --- | --- | --- | --- | --- |
| Example 2-4 | 3.50 | 10.0 | 0.50 | 2.30 | Present | Absent | Absent |
| Example 2-5 | 3.50 | 10.5 | 0.50 | 2.76 | Present | Absent | Absent |
| Example 2-6 | 3.50 | 11.0 | 0.50 | 2.50 | Present | Present | Absent |
| Comparative Example 3-1 | 3.50 | 7.0 | 0.58 | 0.00 | Absent | Absent | Absent |
| Comparative Example 3-2 | 3.50 | 7.2 | 0.58 | 0.00 | Absent | Absent | Absent |
| Comparative Example 3-3 | 3.50 | 7.5 | 0.58 | 0.00 | Absent | Absent | Absent |
| Comparative Example 3-4 | 3.50 | 7.4 | 0.58 | 0.54 | Absent | Absent | Absent |
| Comparative Example 3-5 | 3.50 | 8.0 | 0.58 | 0.51 | Absent | Absent | Absent |
| Example 3-1 | 3.50 | 8.5 | 0.58 | 1.51 | Present | Absent | Absent |
| Example 3-2 | 3.50 | 9.0 | 0.58 | 1.44 | Present | Absent | Absent |
| Example 3-3 | 3.50 | 9.5 | 0.58 | 2.14 | Present | Absent | Absent |
| Example 3-4 | 3.50 | 9.8 | 0.58 | 1.73 | Present | Present | Absent |
| Example 3-5 | 3.50 | 10.0 | 0.58 | 1.80 | Present | Present | Absent |
| Comparative Example 4-1 | 3.50 | 8.0 | 0.33 | 0.00 | Absent | Absent | Absent |
| Comparative Example 4-2 | 3.50 | 8.2 | 0.33 | 0.00 | Absent | Absent | Absent |
| Comparative Example 4-3 | 3.50 | 8.4 | 0.33 | 0.00 | Absent | Absent | Absent |
| Comparative Example 4-4 | 3.50 | 8.6 | 0.33 | 0.00 | Absent | Absent | Absent |
| Example 4-1 | 3.50 | 9.0 | 0.33 | 2.34 | Present | Absent | Absent |
| Example 4-2 | 3.50 | 9.5 | 0.33 | 2.91 | Present | Absent | Absent |
| Example 4-3 | 3.50 | 10.0 | 0.33 | 4.49 | Present | Absent | Absent |
| Example 4-4 | 3.50 | 10.5 | 0.33 | 3.46 | Present | Absent | Absent |
| Example 4-5 | 3.50 | 11.0 | 0.33 | 4.63 | Present | Absent | Absent |
| Comparative Example 4-5 | 3.50 | 11.5 | 0.33 | 3.44 | Present | Present | Present |
| Comparative Example 5-1 | 3.50 | 8.0 | 0.25 | 0.00 | Absent | Absent | Absent |
| Comparative Example 5-2 | 3.50 | 8.5 | 0.25 | 0.00 | Absent | Absent | Absent |
| Comparative Example 5-3 | 3.50 | 9.0 | 0.25 | 0.35 | Absent | Absent | Absent |
| Comparative Example 5-4 | 3.50 | 9.5 | 0.25 | 0.55 | Absent | Absent | Absent |
| Comparative Example 5-5 | 3.50 | 10.0 | 0.25 | 0.00 | Absent | Absent | Absent |
| Comparative Example 5-6 | 3.50 | 10.5 | 0.25 | 0.31 | Absent | Absent | Absent |
| Example 5-1 | 3.50 | 11.0 | 0.25 | 1.40 | Present | Absent | Absent |
| Comparative Example 5-7 | 3.50 | 11.5 | 0.25 | 0.80 | Present | Present | Present |
| Comparative Example 5-8 | 3.50 | 12.0 | 0.25 | 2.06 | Present | Present | Present |

(Microscopic Observation and Others)

Figure 5:
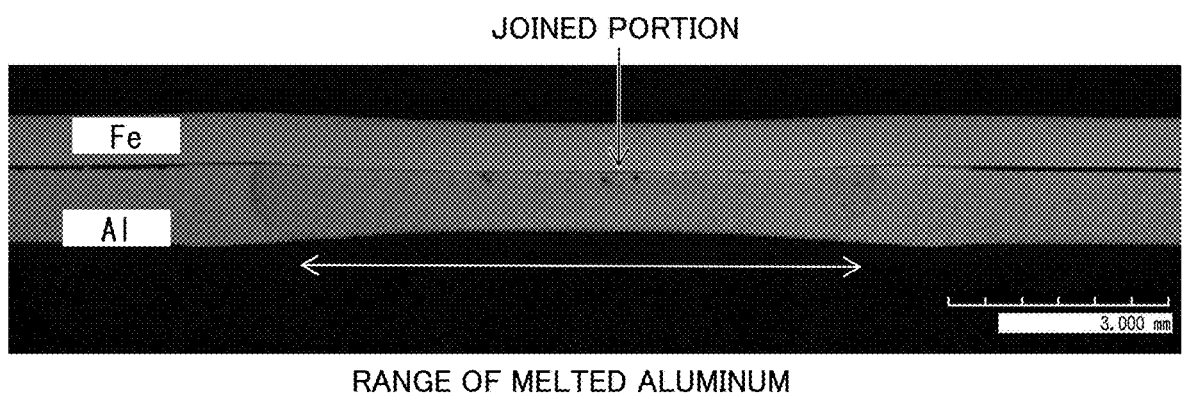
FIG. 5 is a photograph of the cross-section of a test piece of Example 1-1.
Figure 6A:
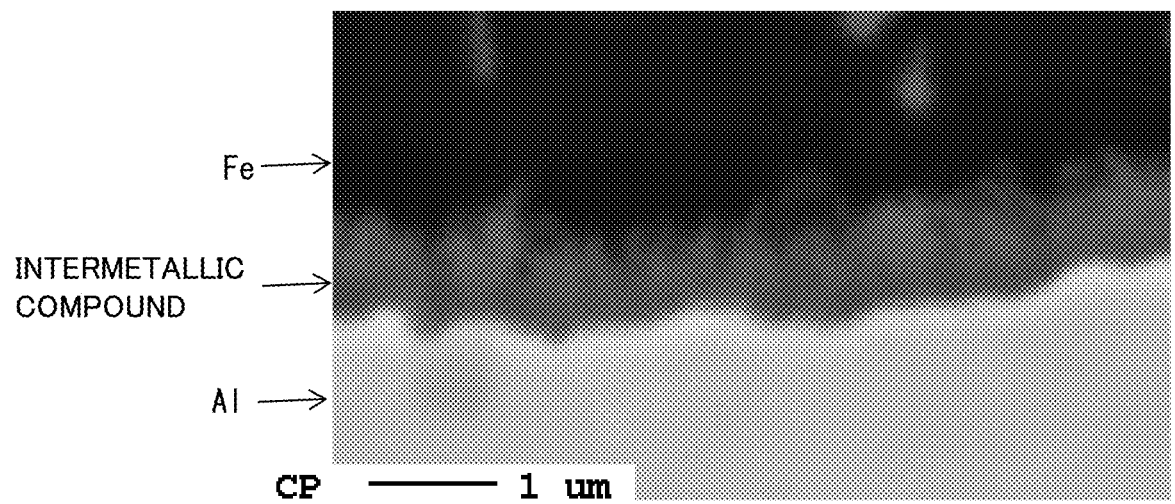
FIG. 6A is a photograph of the cross-section of a joined portion of the test piece of Example 1-1 observed with a scanning electron microscope (SEM)
Figure 6B:
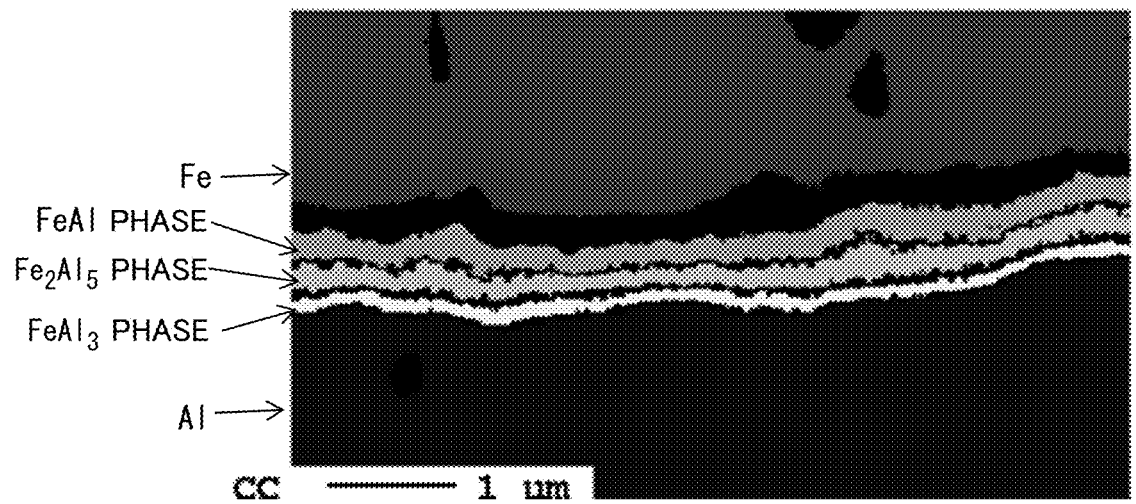
FIG. 6B is an image of the joined portion in FIG. 6A analyzed with an electron probe microanalyzer (EPMA).

All of the aforementioned test pieces were cut in the thickness direction, and their cross-sections were observed with a microscope and analyzed with an electron probe microanalyzer (EPMA). FIG. 5 is a photograph of the cross-section of the test piece of Example 1-1. FIG. 6A is a photograph of the cross-section of the joined portion of the test piece of Example 1-1 observed with the scanning electron microscope (SEM). FIG. 6B is an image of the joined portion of FIG. 6A analyzed with the electron probe microanalyzer (EPMA). Table 1 shows the presence or absence of an intermetallic compound between the first metal plate and the second metal plate of each test piece.

(Results and Consideration)

As shown in Table 1, the shear strength of each of the test pieces of Examples 1-1 to 1-8, Examples 2-1 to 2-6, Examples 3-1 to 3-5, Examples 4-1 to 4-5, and Example 5-1, was over 1.4 kN. However, the shear strength of each of the test pieces of Comparative Examples 1-1 and 1-2, Comparative Examples 2-1 to 2-5, Comparative Examples 3-1 to 3-5, Comparative Examples 4-1 to 4-4, and Comparative Examples 5-1 to 5-6, was below 1.0 kN.

Further, as shown in FIG. 5, in the test piece of Example 1-1, aluminum alloy of the first metal plate was melted by welding, but steel that is the second metal was not melted. Further, as shown in FIGS. 6A and 6B, an Fe—Al intermetallic compound was generated between the first metal plate and the second metal plate. Likewise, in the test pieces of the other Examples, aluminum alloy that is the first metal was melted by welding, while steel that is the second metal plate was not melted, and an intermetallic compound was generated between the first metal plate and the second metal plate. Meanwhile, in each of the test pieces of Comparative Examples 1-1 and 1-2, Comparative Examples 2-1 to 2-5, Comparative Examples 3-1 to 3-5, Comparative Examples 4-1 to 4-4, and Comparative Examples 5-1 to 5-6 that have a shear strength below 1.0 kN, an intermetallic compound was not generated between the first metal plate and the second metal plate.

From the results, it is considered that in the aforementioned Examples, the second metal plate was heated (resistance-heated) with current supplied thereto during welding, and a part of the first metal plate was melted by the heat. It is also considered that due to the melting of the first metal of the first metal plate, the second metal of the second metal plate diffused to the melted portion of the first metal, and an intermetallic compound was generated between the first metal plate and the second metal plate. Consequently, the joint strength between the first metal plate and the second metal plate is considered to have improved. The thickness of the intermetallic compound at the portion of the first metal plate pressurized from the side of the second metal plate was thinner than that of the intermetallic compound in the surrounding thereof.

Meanwhile, in Comparative Examples 1-1 and 1-2, Comparative Examples 2-1 to 2-5, Comparative Examples 3-1 to 3-5, Comparative Example 4-1 to 4-4, and Comparative Examples 5-1 to 5-6, it is considered that an intermetallic compound was not generated between the first metal plate and the second metal plate because the value of current supplied or the current supply time during welding was not sufficient.

In Example 1-8, Example 2-6, and Examples 3-4 and 3-5, the melted first metal scattered but the second metal plate did not melt. Therefore, it is considered that the first and second metal plates were not heated excessively and shear strength was thus secured. Meanwhile, in Comparative Example 4-5 and Comparative Examples 5-7 and 5-8, an intermetallic compound was formed between the first metal plate and the second metal plate and shear strength was thus over 1.4 kN. However, in such cases, not only did the melted first metal scatter, but also the second metal plate melted. Therefore, there is a high possibility that voids and the like may be generated in the first and second metal plates, resulting in an unstable shear strength and a strength other than the shear strength that is lower than those of the other Examples.

Although the embodiments of the present disclosure have been described in detail above, the present disclosure is not limited thereto, and various design changes can be made within the spirit and scope of the present disclosure recited in the appended claims.

DESCRIPTION OF SYMBOLS

1 Resistance-welding apparatus
11 First metal plate
12 Second metal plate
12a Overlapping portion
12b Current-flowing region
13 Intermetallic compound
66, 67 Electrodes
69 Pressurizing member

What is claimed is:

1. A method for joining two dissimilar metal plates, comprising:
   overlaying, as the dissimilar metal plates, a first metal plate and a second metal plate one on top of the other, the first metal plate being made of a first metal, the second metal plate being made of a second metal with a higher volume resistivity than that of the first metal and having a higher melting point than that of the first metal;
   bringing a pair of electrodes into contact with a surface of a portion of only the second metal plate overlapping the first metal plate, without any electrodes contacting the first metal plate, wherein the pair of electrodes are arranged opposite each other with a space therebetween; and
   supplying current between the pair of electrodes to create a current-flowing region within the second metal plate, so as to resistance-heat the second metal present in the current-flowing region to a temperature lower than the melting point of the second metal and higher than the melting point of the first metal, thereby partially melting the first metal plate with heat from the resistance-heated second metal, without melting the second metal plate, so that a melted portion of the first metal plate diffuses to a side of the first metal plate that faces the second metal plate, and so that an intermetallic compound of the first metal and the second metal is generated between the first metal plate and the second metal plate, and thus joining the first and second metal plates via the intermetallic compound,
   wherein:
   the bringing the pair of electrodes into contact with the surface of the portion of the second metal plate overlapping the first metal plate includes arranging a pressurizing member in the space between the pair of electrodes, the pressurizing member being made of a non-conductive material,
   the joining of the first and second metal plates includes supplying current between the pair of electrodes while pressuring the second metal plate against the first metal plate using the pressurizing member arranged between the pair of electrodes, so as to push a portion of the intermetallic compound toward regions outside of an area of the melted portion of the first metal plate, and
   during the step of joining the first and the second metal plates, the pressurizing member is pressurized against the second metal plate with a pressure higher than that of the pair of electrodes.

2. The method for joining two dissimilar metal plates according to claim 1, wherein the first metal plate is one of an aluminum plate or an aluminum alloy plate, and the second metal plate is a steel plate.

3. The method for joining two dissimilar metal plates according to claim 1, wherein the current is supplied between the pair of electrodes such that welding is performed so as to form a fresh surface on the second metal plate by diffusing the elements on the surface of the second metal plate.

4. The method for joining two dissimilar metal plates according to claim 1, wherein the second metal plate is not melted so as to positively pressurize the second metal plate.

5. The method for joining two dissimilar metal plates according to claim 1, the method further comprising cooling a surface layer of the first metal plate while cooling the pair of electrodes, after the current is supplied between the pair of electrodes.

6. The method for joining two dissimilar metal plates according to claim 1, wherein a surface of the first metal plate on a side thereof contacting a mount base is not melted due to the pressurization by the pressurizing member.

7. The method for joining two dissimilar metal plates according to claim 1, wherein the current supplied between the pair of electrodes is supplied while the second metal plate is in a solid-phase state, so that elements on the surface of the second metal plate diffuse to the first metal plate.

* * * * *